United States Patent
Deshmukh et al.

(10) Patent No.: US 11,875,304 B2
(45) Date of Patent: Jan. 16, 2024

(54) METHODS AND APPARATUS FOR GROUPING ITEMS

(71) Applicant: Walmart Apollo, LLC, Bentonville, AR (US)

(72) Inventors: Swati Ajit Deshmukh, Cupertino, CA (US); Mohammad Zohaib Akmal, Santa Clara, CA (US); Abhinav Swami, Sunnyvale, CA (US); Revanth Vutukuri, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 1 day.

(21) Appl. No.: 16/914,962

(22) Filed: Jun. 29, 2020

(65) Prior Publication Data
US 2021/0406812 A1 Dec. 30, 2021

(51) Int. Cl.
*G06Q 10/087* (2023.01)
*G06Q 10/067* (2023.01)
*G06Q 10/0631* (2023.01)
*G06N 20/00* (2019.01)

(52) U.S. Cl.
CPC ........... *G06Q 10/087* (2013.01); *G06N 20/00* (2019.01); *G06Q 10/067* (2013.01); *G06Q 10/06315* (2013.01)

(58) Field of Classification Search
CPC ........... G06Q 10/087; G06Q 10/06315; G06Q 10/067; G06N 20/00
USPC ........................................................ 705/28
See application file for complete search history.

(56) References Cited

U.S. PATENT DOCUMENTS

| | | | |
|---|---|---|---|
| 7,660,788 B1* | 2/2010 | Clark | G06Q 10/087 |
| | | | 707/764 |
| 8,392,225 B2 | 3/2013 | Sribhibhadh et al. | |
| 9,129,277 B2 | 9/2015 | MacIntosh | |
| 9,646,286 B2 | 5/2017 | Brelig et al. | |
| 9,679,321 B1* | 6/2017 | Pitzel | G06Q 30/0609 |
| 2002/0026369 A1 | 2/2002 | Miller et al. | |
| 2002/0161749 A1* | 10/2002 | Pratt | G06F 16/258 |
| 2003/0101168 A1* | 5/2003 | Chow | G06Q 30/0603 |
| 2006/0080274 A1* | 4/2006 | Mourad | G06Q 30/02 |
| 2009/0018996 A1* | 1/2009 | Hunt | G06F 16/2264 |

(Continued)

*Primary Examiner* — Luna Champagne
(74) *Attorney, Agent, or Firm* — Morgan, Lewis & Bockius LLP; Manita Rawat

(57) ABSTRACT

This application relates to apparatus and methods for automatically grouping the same or similar items provided by various suppliers that may use various supplier identification systems to identify the items to a retailer. In some examples, a computing device receives a supplier identifier from a supplier. The supplier identifier identifies an item that the supplier provides to the retailer for sale. The computing device may determine a group identifier for the item, where the group identifier identifies the item within a group of the retailer. The computing device may update the supplier identifier's association to the retailer identifier based on whether the group identifier is also associated with the retailer identifier. In some examples, the computing device executes a machine learning model to determine anomalies within a current database of supplier identifiers and associated retailer identifiers. In some examples, the computing device indicates changes to associations and any detected anomalies.

12 Claims, 9 Drawing Sheets

(56) References Cited

U.S. PATENT DOCUMENTS

2012/0226698 A1 9/2012 Silvestre et al.
2018/0276344 A1* 9/2018 Cochran ............... G16H 40/20

* cited by examiner

METHODS AND APPARATUS FOR GROUPING ITEMS

TECHNICAL FIELD

The disclosure relates generally to retail systems and, more specifically, to automatically grouping items within retail systems.

BACKGROUND

Retailers, in at least some examples, sell items, such as products or services, in stores. Some retailers may also sell items online, such as on websites (e.g., online marketplaces). For example, a retailer may advertise an item on a retailer's website. A customer may user a browser to view the item, and proceed to purchase the item, on the website. Retailers in at least some examples receive items they sell from suppliers. The supplier may associate each item with an identifier, such as a global trade item number (GTIN), media catalog number (MCN), or universal product code (UPC). For example, the supplier may provide items to the retailer to sell, where each item is identified by an identifier.

In at least some examples, the retailer may receive differing identifiers, such as differing types of identifiers (e.g., GTIN vs. UPC), or differing numbers with a same type of identifier, for a same or similar item provided by various suppliers. For example, a retailer may receive a first type of identifier (e.g., GTIN) for an item for a first supplier of the item, and may receive a second type of identifier (e.g., UPC) for the same item from a second supplier of the item. As another example, the retailer may receive a first number of a type of identifier for an item from the first supplier of the item, and may receive a second number of the same type of identifier for the item from the second supplier of the item, where the first number and the second number differ. This differing identification of items from various suppliers may cause various problems for the retailer, such as keeping track of the purchase order, inventory, or sales of the same or similar items.

SUMMARY

The embodiments described herein are directed to automatically grouping the same or similar items provided by various suppliers. For example, a retailer may sell an item that is supplied by both a first supplier, and a second supplier. The item may be a grocery item (e.g., bread, banana, apple, etc.), for example. The first supplier may identify the item with a particular value based on the first supplier's numbering system (e.g., GTIN), and the second supplier may identify the item with another particular value based on the second supplier's numbering system (e.g., UPC). In some examples, the first supplier may identify the item with a particular GTIN, and the second supplier may identify the item with a different GTIN. The embodiments may automatically determine that the item from each of the suppliers is the same, or a similar, item, and may group the items under a same identifier.

In some examples, various groups of a same retailer may assign an identifier (e.g., an internal identifier) to the same or similar items provided by various suppliers. For example, a very large retailer (e.g., a retailer with many stores and/or various sales outlets such as stores and websites) may have different groups (e.g., departments) that handle various aspects of the business. For example, one group may handle purchasing (e.g., from suppliers), and another group may handle sales (e.g., across a plurality of stores and/or websites). Each group may use a different system (e.g., identification system) to identify and group items. For example, a first group may assign an item a first identifier (e.g., a first item group identifier) in a first system. The first identifier may be a first item group identifier, where all items of a same group are assigned the same first item group identifier. The grouping of items may be based on the type of item (e.g., eggs, bread, apples, etc.), for example. Similarly, a second group may assign the item a second identifier (e.g., a second item group identifier) in a second system. The embodiments may automatically determine same or similar items as identified by each of the group's systems, and may group the items under a same identifier (e.g., a third identifier in a third system).

Further, the embodiments may allow for the removal of an item from an existing grouping, and for the merging of the removed item into another grouping. In some examples, the embodiments may allow for the removal of an item from an existing grouping, and for the creation of a new grouping for the item.

As such, the embodiments may allow a retailer, such as a very large retailer, to accurately track items from various suppliers. The embodiments may reduce the amount of time and cost associated with keeping track of items from procurement to sale of the items, for example. The embodiments may further simplify the identification of items among various groups of the retailer, allowing for more efficient communication about and identification of the items. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. In some embodiments, a computing device receives a supplier identifier from a supplier. The supplier identifier identifies an item that the supplier provides to the retailer for sale. The computing device may determine a group identifier for the item, where the group identifier identifies the item within a group of the retailer. The computing device may update the supplier identifier's association to the retailer identifier based on whether the group identifier is also associated with the retailer identifier.

In some examples, the computing device executes a machine learning model to determine anomalies within a current database of supplier identifiers and associated retailer identifiers. In some examples, the computing device indicates changes to associations and any detected anomalies.

In some embodiments, a computing device is configured to receive a first supplier identifier that identifies a first item in a first supplier's numbering system. The computing device is also configured to determine a first retailer identifier associated with the first supplier identifier, where the first retailer identifier identifies the first item in a retailer's first numbering system. Further, the computing device is configured to determine a first group identifier associated with the first supplier identifier, where the first group identifier identifies the first item in a retailer's second numbering system. The computing device is also configured to determine a second retailer identifier associated with the first group identifier. The computing device is further configured to determine whether to associate the first supplier identifier with the second retailer identifier in the retailer's first numbering system based on whether the second retailer identifier matches the first retailer identifier.

In some embodiments, a method is provided that includes receiving a first supplier identifier that identifies a first item in a first supplier's numbering system. The method also includes determining a first retailer identifier associated with the first supplier identifier, where the first retailer identifier identifies the first item in a retailer's first numbering system. Further, the method includes determining a first group identifier associated with the first supplier identifier, where the first group identifier identifies the first item in a retailer's second numbering system. The method also includes determining a second retailer identifier associated with the first group identifier. The method further includes determining whether to associate the first supplier identifier with the second retailer identifier in the retailer's first numbering system based on whether the second retailer identifier matches the first retailer identifier.

In yet other embodiments, a non-transitory computer readable medium has instructions stored thereon, where the instructions, when executed by at least one processor, cause a computing device to perform operations that include receiving a first supplier identifier that identifies a first item in a first supplier's numbering system. The operations also include determining a first retailer identifier associated with the first supplier identifier, where the first retailer identifier identifies the first item in a retailer's first numbering system. Further, the operations include determining a first group identifier associated with the first supplier identifier, where the first group identifier identifies the first item in a retailer's second numbering system. The operations also include determining a second retailer identifier associated with the first group identifier. The operations further include determining whether to associate the first supplier identifier with the second retailer identifier in the retailer's first numbering system based on whether the second retailer identifier matches the first retailer identifier.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
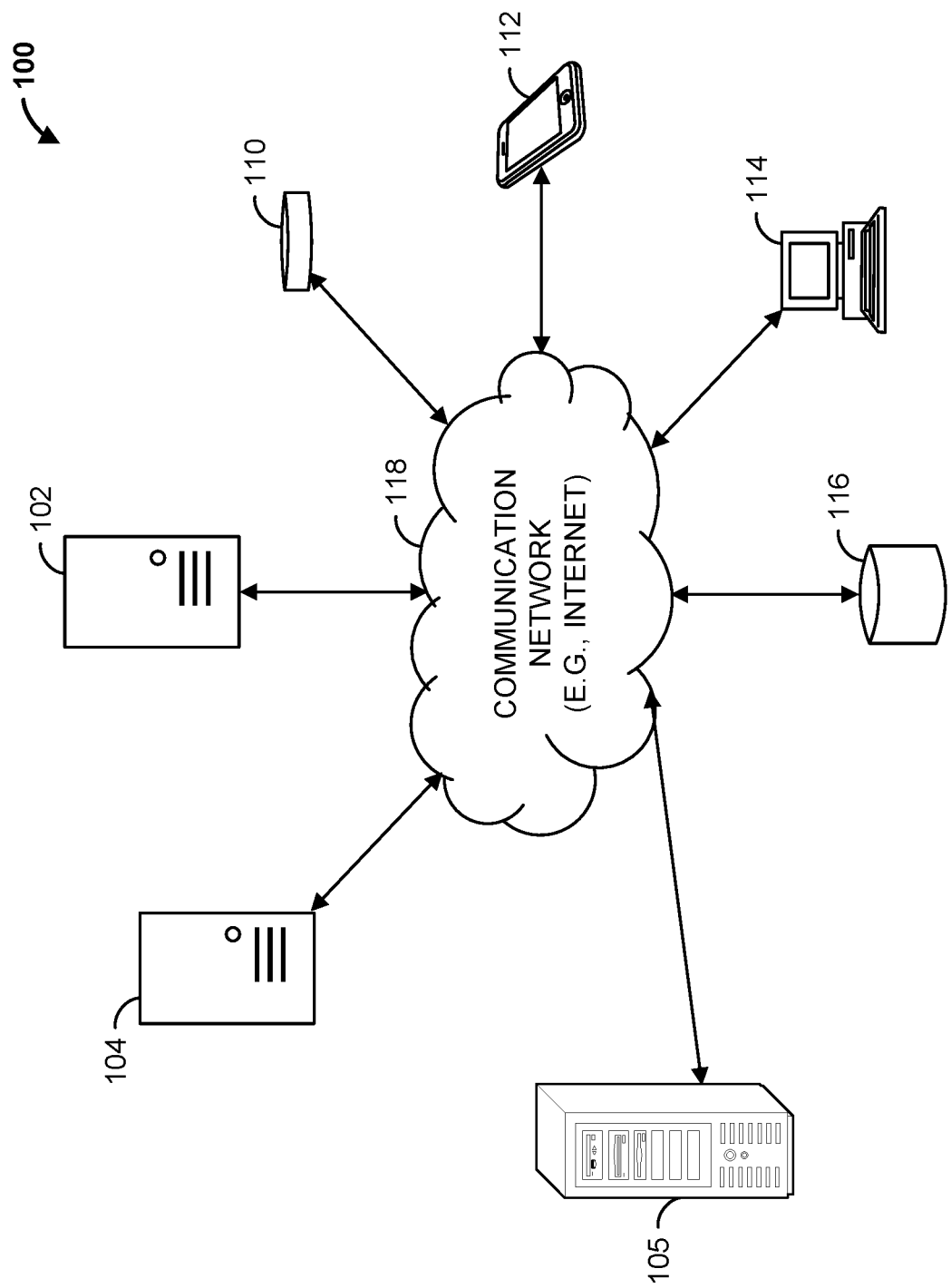
FIG. 1 is a block diagram of an item grouping system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an item grouping system 100 that includes an item grouping computing device 102 (e.g., a server, such as an application server), a web server 104, database 116, at least one supplier server 105, and multiple customer computing devices 110, 112, 114 operatively coupled over network 118. Item grouping computing device 102, web server 104, supplier server 105, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, each of item grouping computing device 102, web server 104, and supplier server 105 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, item grouping computing device 102 is operated by a retailer, and multiple customer computing devices 112, 114 are operated by customers of the retailer. In some examples, each supplier server 105 is operated by a supplier to the retailer. Each supplier may supply one or more items to the retailer that the retailer, in turn, provides for sale, for example.

Although FIG. 1 illustrates three customer computing devices 110, 112, 114, item grouping system 100 can include any number of customer computing devices 110, 112, 114. Similarly, item grouping system 100 can include any number of item grouping computing devices 102, web servers 104, supplier servers 105, and databases 116.

In some examples, web server 104 hosts one or more web pages, such as a retailer's website. For example, web server 104 may host an online marketplace where customers may view and purchase items. The online marketplace may provide for sale a variety of items, such as grocery items. The items may be provided to the retailer by one or more suppliers (e.g., that operate one or more supplier servers 105). Customers may, via customer computing devices 110, 112, 114 communicating with web server 104 over communication network 118, visit the online marketplace and view the items (e.g., item listings). Customers may also purchase the listed items via the online marketplace. For example, the online marketplace may provide an "add-to-cart" that, when engaged (e.g., clicked on) by the customer, facilitates the placement of items into an online shopping cart. The online marketplace may further provide a "checkout" icon that facilitates the purchase of the items in the online shopping cart.

Item grouping computing device 102 is operable to communicate with database 116 over communication network 118. For example, item grouping computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to item grouping computing device 102, in some examples, database 116 can be a local storage device, such as a hard drive, a non-volatile memory, or a USB stick.

In some examples, supplier servers 105 provide supplier item data to item grouping computing device 102. The supplier item data may identify one or more items the supplier is providing to a retailer. The supplier item data may identify each item by a supplier identifier, such as a GTIN or UPC. Each supplier may identify the same item, or a similar item, with different supplier identifiers. Item grouping computing device 102 may store the supplier item data to database 116. Item grouping computing device 102 may also store retailer group data in database 116. The retailer group data may identify a grouping of items, such as the items from the suppliers, as well as a retailer identification (ID) for each grouping of items. As described herein, item grouping computing device 102 may determine the retailer IDs based on one or more models (e.g., algorithms), such as a rule-based model or a machine learning based model.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some examples, item grouping computing device 102 receives supplier item data from supplier server 105, and stores the supplier item data in database 116. The supplier item data may include a supplier identifier, such as a GTIN, MCN, or UPC, for each item. Item grouping computing device 102 may determine whether the item is associated with any group IDs. A group ID identifies a grouping of items based on their supplier identifier. For example, each of a plurality of supplier identifiers (e.g., from the same or different suppliers) may be associated with a same group ID. In some examples, one or more groups of a retailer determines (or has previously determined) group IDs for items provided by each supplier. For example, one group may associate an item with a first group ID, and another group may associate the same item with a second group ID. In some examples, each group determines (or has determined) the group IDs based on the type, or description, of the item. In some examples, the item is not associated with any group ID.

Item grouping computing device 102 may determine a retailer ID for an item based on the supplier identifier and/or any group IDs associated with the item. For example, item grouping computing device 102 may determine the retailer ID based on one or more models (e.g., rules, algorithms) as described herein.

Figure 7A:
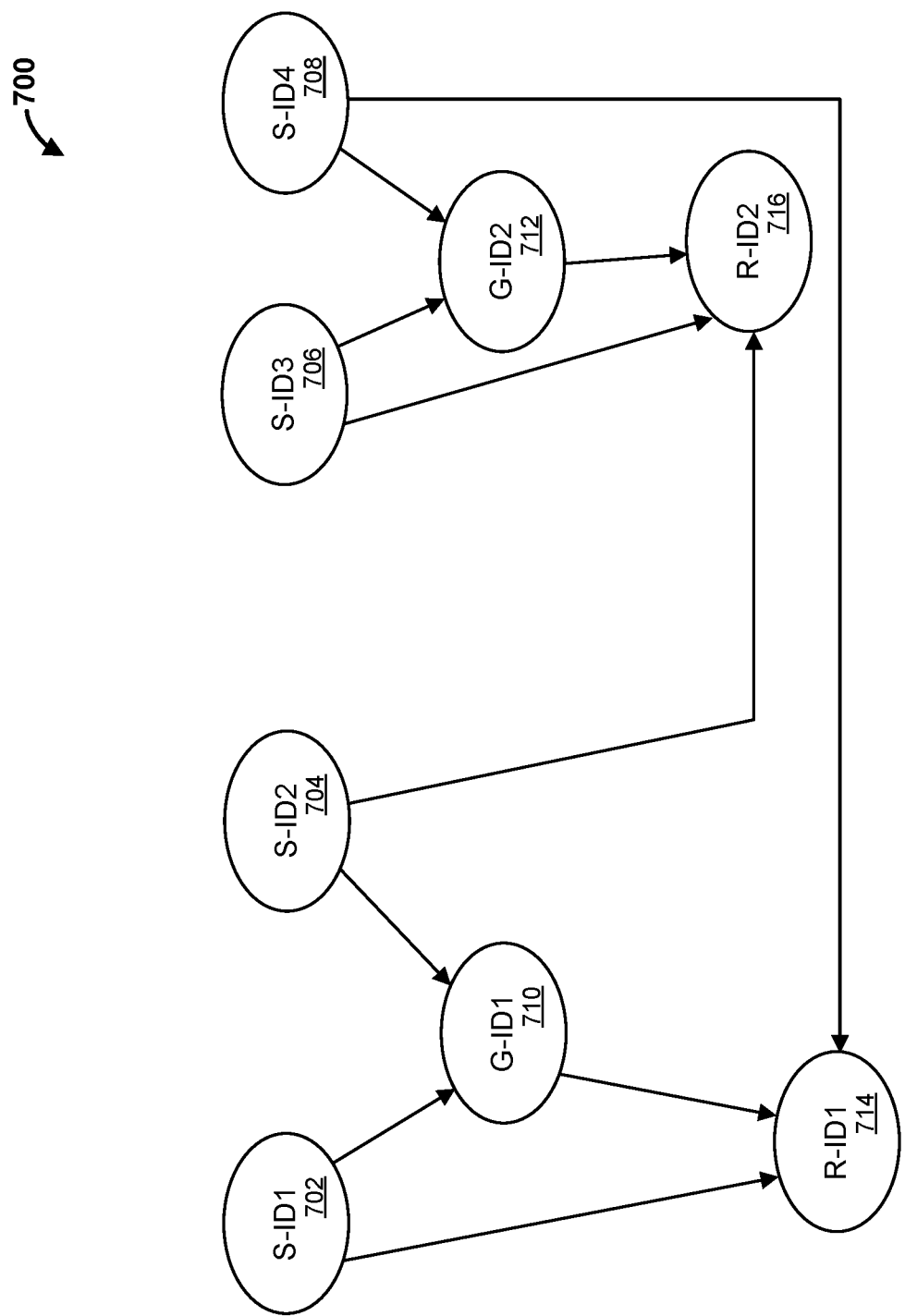
FIGS. 7A and 7B illustrate graphical charts of item identifier associations in accordance with some embodiments.
Figure 7B:
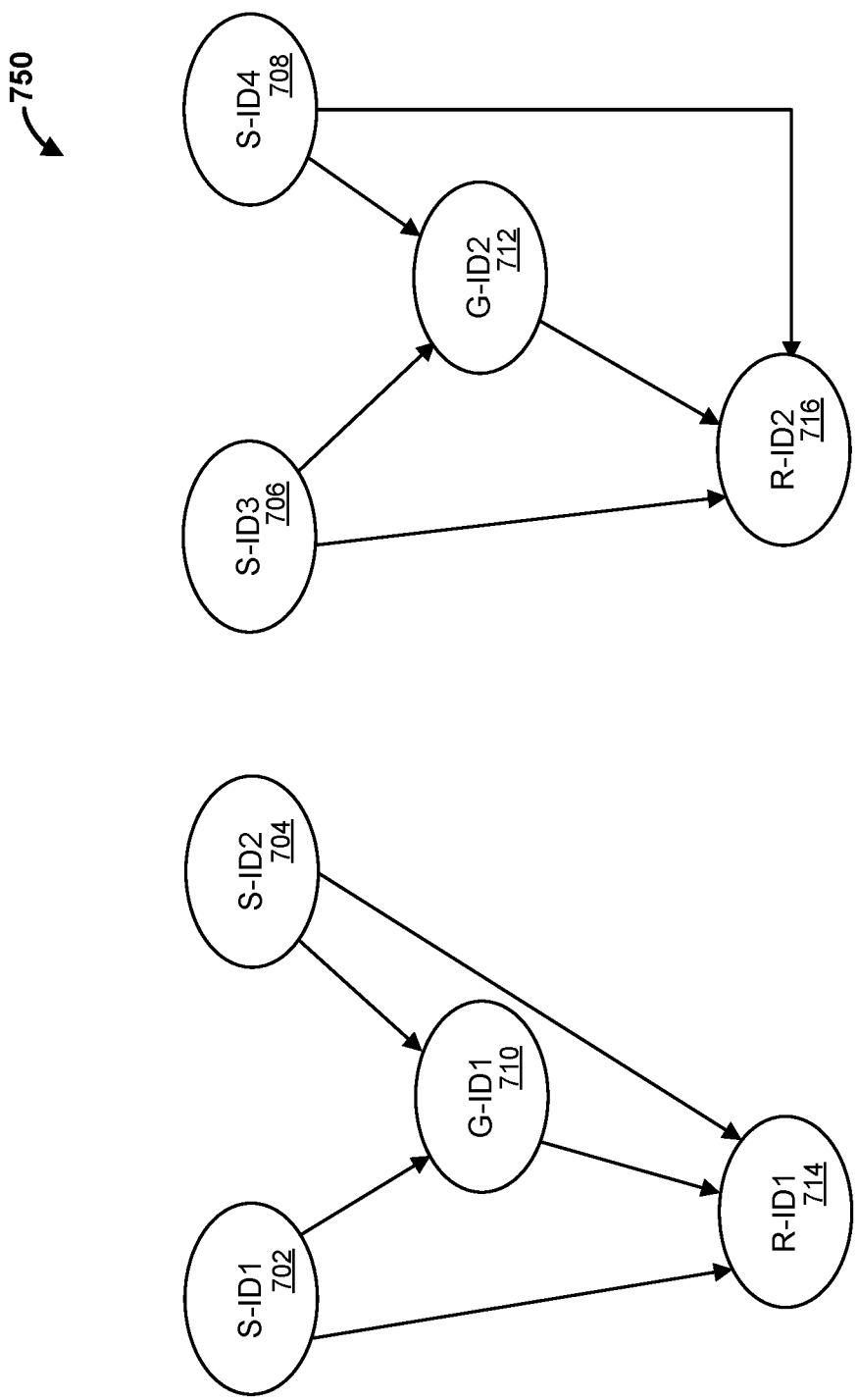

For example, FIGS. 7A and 7B illustrate graphical charts 700, 750, respectively, associating supplier IDs 702, 704, 706, 708 to group IDs 710, 712 and retailer IDs 714, 716. In some examples, the charts 700, 750 are stored in database 116. Graphical chart 700 represents associations before changes, and graphical chart 750 represents associations after changes. For these figures, assume that first supplier ID 702 and second supplier ID 704 are GTINs from a first supplier and a second supplier, respectively, and each identify a same first item, such as bananas. Further, assume that third supplier ID 706 and fourth supplier ID 708 are GTINs from the first supplier and the second supplier, respectively, and each identify a same second item, such as apples.

Referring to FIG. 7A, first supplier ID 702 and second supplier ID 704 are each associated with a first group ID 710, and third supplier ID 706 and fourth supplier ID 708 are each associate with a second group ID 712. The supplier ID associations to the group IDs may have been determined by a group of a retailer, for example. Further, first supplier ID 702 and fourth supplier ID 708 are each also associated with a first retailer ID 714, and second supplier ID 704 and third supplier ID 706 are each also associated with a second retailer ID 716.

The retail IDs 714, 716 may be used by the retailer to identify (e.g., classify) item types of items sold at a website, such as a website hosted by web server 104, or sold at a store. In some examples, the retailer may use the retail IDs 714, 716 to track inventory of a type of item (e.g., bananas and apples).

In this example, first supplier ID 702 and second supplier ID 704 each identify the first item (e.g., bananas), and they are each associated with group ID 710. Assuming first group ID 710 identifies a group of items that includes the first item, the association between each of first supplier ID 702 and second supplier ID 704 to first group ID 710 is proper. In addition, although first supplier ID 702 and second supplier ID 704 each identify the first item, they are each currently associated with different retailer IDs 714, 716. This may present issues for the retailer. For example, if a retailer attempts to determine how many of the first item they have in inventory, and do not realize that the same item appears under two different retail IDs 714, 716, an inventory count may not be accurate. Moreover, even if the retailer does realize that two different retail IDs 714, 716 represent the same item, nonetheless an inventory count may still be inaccurate if any of the two different retail IDs 714, 716 are used to identify other types of items.

Similarly, third supplier ID 706 and fourth supplier ID 708 each identify the second item (e.g., apples), and they are each associated with second group ID 712. Assuming second group ID 712 identifies a group of items that includes the second item, the associations between each of third supplier ID 706 and fourth supplier ID 708 to second group ID 712 is proper. However, although third supplier ID 706 and fourth supplier ID 708 each identify the second item, they are each currently associated with different retailer IDs 714, 716. This may present issues for the retailer, for at least similar reasons as noted above.

Item grouping computing device 102 may occasionally (e.g., periodically) perform an accuracy check of chart 700 to determine whether supplier IDs are properly (e.g., accurately) associated with one or more group IDs 710, 712 and/or a retailer ID 714, 716. For example, item grouping computing device 102 may perform an accuracy check of the group ID and retailer ID associations of first supplier ID 702. Item grouping computing device 102 may determine from chart 700 that the current group ID and retail ID associations to first supplier ID 702 are first group ID 710 and first retailer ID 714, respectively. Item grouping computing device 102 may further determine from chart 700 the retailer ID for any determined group IDs. As such, in this example, item grouping computing device 102 determines that first group ID 710 is associated with first retailer ID 714.

Item grouping computing device 102 may then determine if the retailer IDs associated with the supplier ID and with any group IDs are the same. Here, for example, item grouping computing device 102 may compare first retailer ID 714 associated with first supplier ID 702 with first retailer ID 714 associated with first group ID 710. Item grouping computing device 102 determines that the retail IDs associated with first supplier ID 702 and with first group ID 710 are the same, namely, first retailer ID 714. In response, item grouping computing device 102 leaves the first retailer ID 714 and first group ID 710 associations to first supplier ID 702 unchanged, as illustrated in FIG. 7B.

Continuing the accuracy check of chart 700, item grouping computing device 102 may determine from chart 700 the current group ID and retail ID associations to second supplier ID 704 that, in this example, are first group ID 710 and second retailer ID 716, respectively. Item grouping computing device 102 may further determine from chart 700 that first group ID 710 is associated with first retailer ID 714.

Item grouping computing device 102 may then compare first retailer ID 714 (to which second supplier ID 704 is associated with) to second retailer ID 716 (to which first group ID 710 is associated with) to determine whether they are the same retailer ID. Item grouping computing device 102 may replace the current retailer ID based on a rule that retailer ID associations to group IDs associated with a supplier ID prevails over a retailer ID associations to the supplier ID. In this example, item grouping computing device 102 determines that they are not the same retailer ID. In response to determining that they are not the same retailer ID, item grouping computing device 102 may replace the current retailer ID association with second supplier ID 704 with the retailer ID associated with first group ID 710, namely, first retailer ID 714, as illustrated in FIG. 7B. As a result, each of first supplier ID 702 and second supplier ID 704, which identify the first item (e.g., bananas), are now associated with the same first retailer ID 714.

Further, item grouping computing device 102 may determine from chart 700 the current group ID and retail ID associations to third supplier ID 706 that, in this example, are second group ID 712 and second retailer ID 716, respectively. Item grouping computing device 102 may further determine from chart 700 that second group ID 712 is associated with second retailer ID 716.

Item grouping computing device 102 may then compare second retailer ID 716 (to which third supplier ID 706 is associated with) to second retailer ID 716 (to which second group ID 710 is associated with) to determine whether they are the same retailer ID. In this example, item grouping computing device 102 determines that they are the same retailer ID and, in response, leaves the second retailer ID 716 and second group ID 712 associations to third supplier ID 706 unchanged, as illustrated in FIG. 7B.

Continuing the accuracy check of chart 700, item grouping computing device 102 may determine from chart 700 the current group ID and retail ID associations to fourth supplier ID 708 that, in this example, are second group ID 712 and first retailer ID 714, respectively. Item grouping computing device 102 may further determine from chart 700 that second group ID 712 is associated with second retailer ID 716.

Item grouping computing device 102 may then compare first retailer ID 714 (to which fourth supplier ID 708 is associated with) to second retailer ID 716 (to which second group ID 712 is associated with) to determine whether they are the same retailer ID. Item grouping computing device 102 may replace the current retailer ID based on a rule that retailer ID associations to group IDs associated with a supplier ID prevails over a retailer ID associations to the supplier ID. In this example, item grouping computing device 102 determines that they are not the same retailer ID. In response to determining that they are not the same retailer ID, item grouping computing device 102 may replace the current retailer ID association with fourth supplier ID 708 with the retailer ID associated with the second group ID 712, namely, second retailer ID 716, as illustrated in FIG. 7B. As a result, each of third supplier ID 706 and fourth supplier ID 708, which identify the second item (e.g., apples), are now associated with the same second retailer ID 716.

In some examples, item grouping computing device 102 receives a supplier ID (e.g., from supplier server 105), and determines whether the supplier ID is represented by graphical chart 750. For example, item grouping computing device 102 may determine whether the received supplier ID matches any of first supplier ID 702, second supplier ID 704, third supplier ID 706, or fourth supplier ID 708. If the received supplier ID does not match any of the supplier IDs represented by graphical chart 750, item grouping computing device 102 generates a new retail ID, and associates the received supplier ID to the new retail ID.

In some examples, item grouping computing device 102 may execute a model, such as a machine learning model, to detect anomalies within graphical chart 700 in FIG. 7A. The anomalies may be, for example, inaccurate supplier ID associations to group IDs or retailer IDs. The machine learning model may be trained with supervised data based on attributes (e.g., properties) of a plurality of items. The attributes may include, for example, one or more of a price, brand, description, options, weight, quantity, or any other attribute of each item.

For example, item grouping computing device 102 may generate features based on one or more properties of the item associated with each supplier ID 702, 704, 706, 708. Item grouping computing device 102 may execute the machine learning model based on the generated features for each item to determine anomalies. For example, item grouping computing device 102 may detect that second supplier ID 705 is inaccurately associated to second retailer ID 716, or that fourth supplier ID 708 is inaccurately associated to first retailer ID 714. In some examples, item grouping computing device 102 provides an indication of each anomaly (e.g., displays the anomalies, and/or transmits a communication (email, text, etc.) identifying the anomaly).

In some examples, item computing device 102 generates word embeddings of item descriptions for each item associated with each supplier ID, and provides the generated word embeddings as inputs to the machine learning model for execution. In some examples, each group ID is associated with a corresponding group ID description. Item computing device 102 may generate word embeddings of the group ID descriptions, and may provide the generated group ID word embeddings as inputs to the machine learning model for execution. Similarly, in some examples, each retailer ID is associated with a corresponding retailer ID description. Item computing device 102 may generate word embeddings of the retailer ID descriptions, and may provide the generated retailer ID word embeddings as inputs to the machine learning model for execution.

Referring back to FIG. 1, once item grouping computing device 102 determines (e.g., assigns or updates) a retailer ID for an item, item grouping computing device 102 may group items associated with the same supplier identifier (e.g., the same GTIN or the same UPC), including items from other suppliers, with the same retailer ID.

In some examples, item grouping computing device 102 receives supplier item data from supplier server 105 identifying at least one supplier identifier for an item. Item grouping computing device 102 may determine whether the supplier identifier is currently associated with a group ID (e.g., such as first group ID 710 or second group ID 712), and a retailer ID (e.g., such as first retailer ID 714 or second retailer ID 716).

If the supplier identifier is not associated with a group ID and is not associated with a retailer ID, item grouping computing device 102 may generate a new retailer ID and assign the supplier identifier to the new retailer ID. Item grouping computing device 102 may further provide an indication of the assignment. For example, item grouping computing device 102 may display the assignment, and transmit a communication, such as an email or text message, identifying the assignment. As such, an associate of the retailer may then determine whether the new assignment is appropriate.

In some examples, if the supplier identifier is associated with a group ID but not with a retailer ID, item grouping computing device 102 may determine whether the group ID is assigned to a retailer ID. If the group ID is assigned to a retailer ID, the supplier identifier is assigned to the same retailer ID.

If the group ID is not assigned to a retailer ID, item grouping computing device 102 may perform any of the processes described herein to assign the supplier identifier to a retailer ID. For example, item grouping computing device 102 may perform any of the processes described herein to check the accuracy of a current graphical chart (e.g., as with respect to FIGS. 7A, 7B), where the current graphical chart includes (e.g., identifies) the association of the supplier identifier to the group ID. Item grouping computing device 102 may update the graphical chart based on the accuracy check.

If the supplier identifier is associated with a retailer ID but not with a group ID, item grouping computing device 102 may also perform any of the processes described to check the accuracy of the current graphical chart. Item grouping computing device 102 may update the graphical chart based on the accuracy check.

Figure 2:
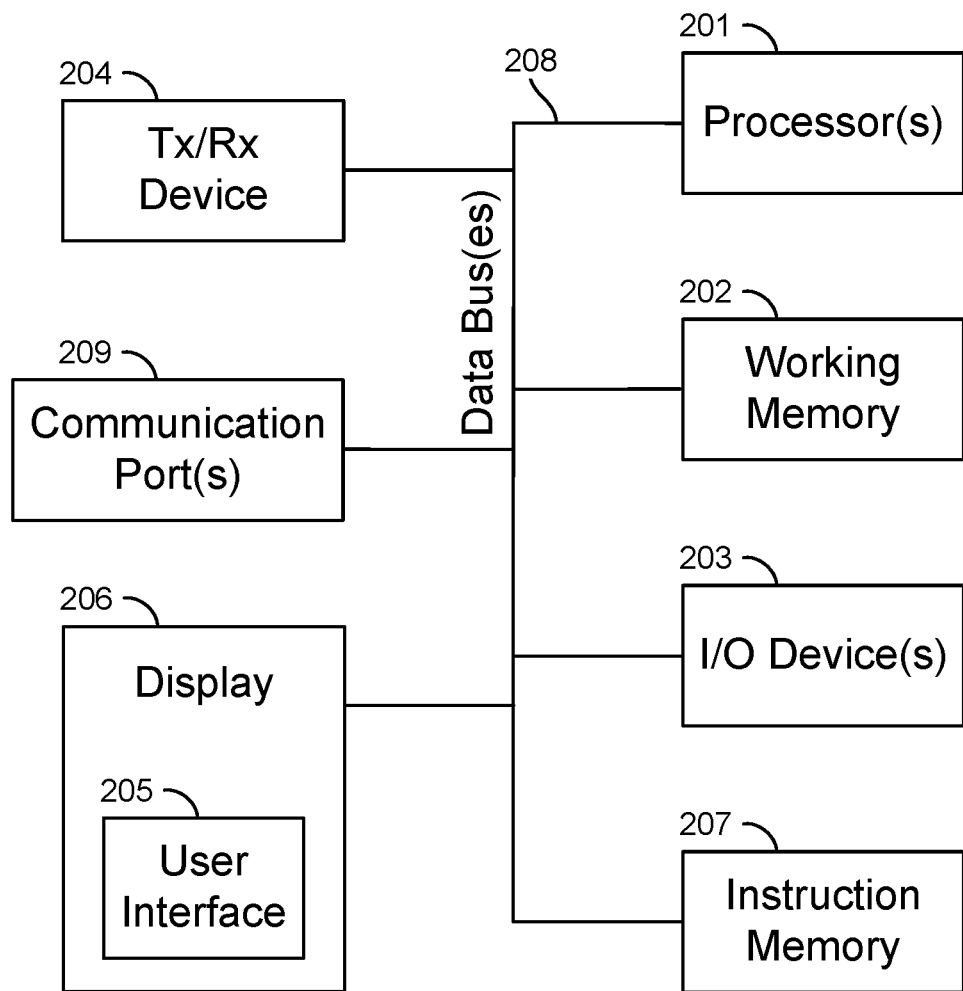
FIG. 2 is a block diagram of an item grouping computing device of the item grouping system FIG. 1 in accordance with some embodiments.

FIG. 2 illustrates the item grouping computing device 102 of FIG. 1. Item grouping computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item grouping computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as supplier item data.

Display 206 can display user interface 205. User interfaces 205 can enable user interaction with item grouping computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 item grouping computing device 102 will be operating in. Processor(s) 201 is operable to receive data from, or send data to, a network, such as communication network 118 of FIG. 1, via transceiver 204.

Figure 3:
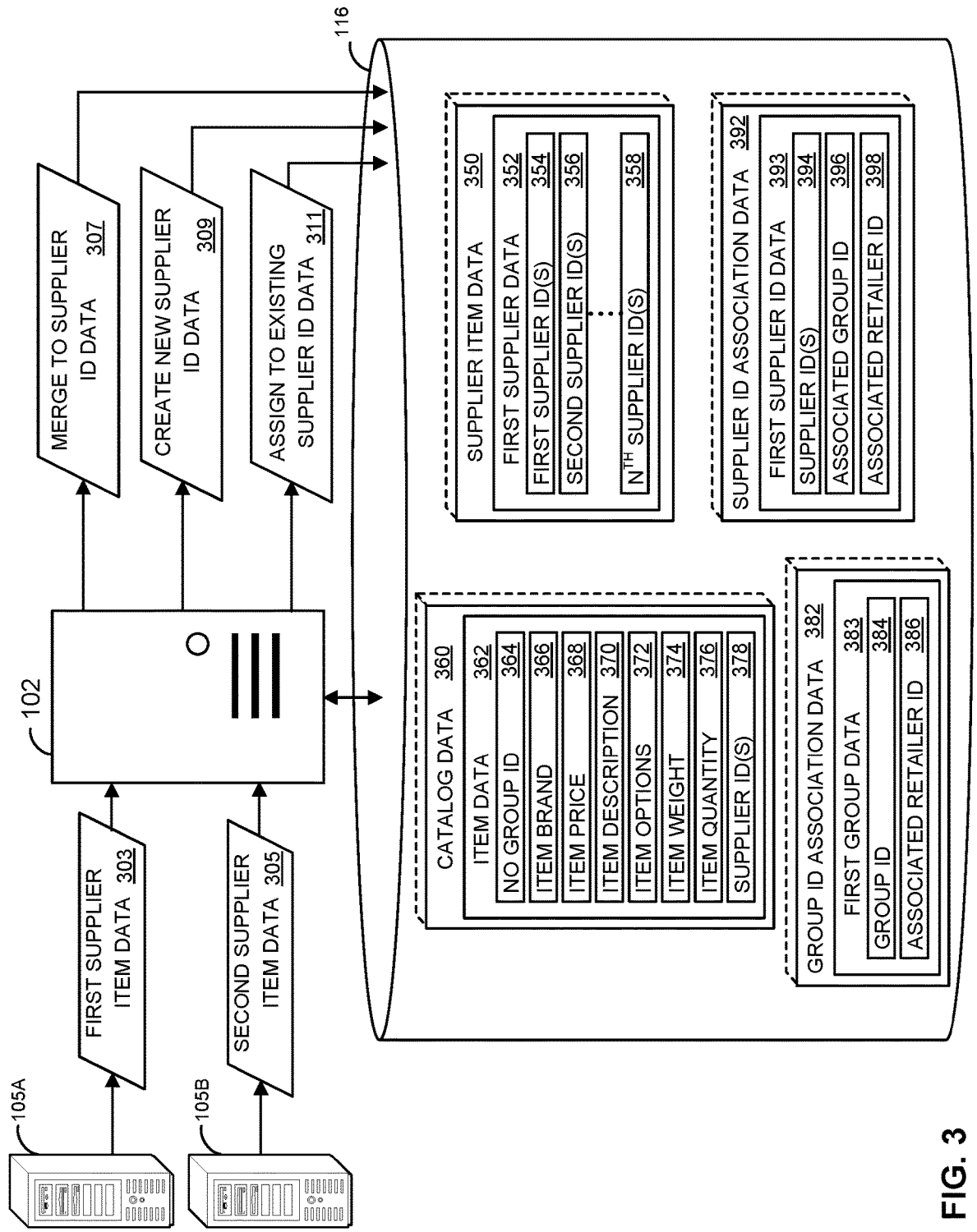
FIG. 3 is a block diagram illustrating examples of various portions of the item grouping system of FIG. 1 in accordance with some embodiments.

FIG. 3 is a block diagram illustrating examples of various portions of the item grouping system 100 of FIG. 1. As indicated in the figure, item grouping computing device 102 may receive first supplier item data 303 from a first supplier server 105A. First supplier item data 303 may identify one or more items, such as items that the first supplier supplies to a retailer. First supplier item data 303 may identify, for each item, a supplier identifier (e.g., GTIN, MCN, UPC). Similarly, item grouping computing device 102 may receive second supplier item data 305 from a second supplier server 105B. Second supplier item data 305 may identify one or more items, such as items that the second supplier supplies to the retailer. Second supplier item data 305 may identify, for each item, a supplier identifier.

In some examples, first supplier item data 303 and second supplier item data 305 may identify differing supplier identifiers for a same item (or item type). In some examples, first supplier item data 303 and second supplier item data 305 may identify the same supplier identifier, but for different items (or item types). In some examples, first supplier item data 303 and second supplier item data 305 may identify the same supplier identifier for the same item (or item type). Further, in some examples, first supplier item data 303 and second supplier item data 305 may identify differing supplier identifiers for differing items (or item types). In some examples, first supplier item data 303 or second supplier item data 305 identify a plurality (e.g., two) of supplier identifiers (e.g., a UPC, and a GTIN) for the same item.

Item computing grouping computing device 102 may parse first supplier item data 303 and second supplier item data 305, extract the supplier identifiers, and store the supplier identifiers as supplier item data 350 in database 116. Supplier item data 350 may identify supplier identifiers for each of a plurality of suppliers. For example, supplier item data 350 may include supplier data, such as first supplier data 352, for each supplier that supplies items to a retailer. First supplier data 352 includes one or more first supplier identifiers 354 for a first item, one or more second supplier identifiers 356 for a second item, and up to one or more $N^{th}$ supplier identifiers 358 for each of any number of additional items received in first supplier item data 303 from first supplier server 105A.

Database 116 stores catalog data 360, which identifies item data 362 for each item corresponding to supplier identifiers received from supplier servers, such as first supplier server 105A and second supplier server 105B. Catalog data 360 may be received from supplier servers 105A, 105B (e.g., in first supplier item data 303 or second supplier item data 305), or may be configured by a retailer, for example. Catalog data 360 includes item data 362 for each item, where item data 362 identifies supplier identifiers 378 for the item, and one or more properties of the item. Supplier IDs 378 may correspond to supplier IDs received in first supplier item data 303 and second supplier item data 305, which may be stored as supplier item data 350. The properties of each item may include one or more of an item brand 366, an item price 368, an item description 370 (e.g., a description of the item such as item features), item options 372 (e.g., item colors, sizes, flavors, etc.), an item weight 374, and an item quantity 376 (e.g., how many of the item in a given container, such as "4" for four apples).

Database 116 may further store group identification association data 382, which identifies group identifiers and associated retailer identifiers. For example, first group data 383 includes group identifier 384 and one or more associated retailer identifiers 386. As an example, group identifier 384 may be first group identifier 710, and associated retailer identifiers 386 may be first retailer identifier 714 and second retailer identifier 716. In some examples, a group of a retailer may (e.g., via input/output devices 203 or user interface 205) configure group identification association data 382 into database 116 by a group of a retailer, for example. In some examples, group identification association data 382 is part of a legacy item classification system of a retailer's item management system.

Database 116 also stores supplier identification association data 392, which identifies supplier identifiers and associated group identifiers and retailer identifiers. Supplier identification association data 392 may identify the associations as described above with respect to graphical chart 750, for example. Supplier identification association data 392 may include supplier identification data for each supplier, such as for a first supplier that provides first supplier item data 303 and for a second supplier that provides second supplier item data 305. Supplier identification data may identify a supplier identifier, an associated group identifier, and an associated retailer identifier. For example, first supplier identification data 393 includes supplier identifier 394, associated group identifier 396, and associated retailer identifier 398.

Item computing grouping computing device 102 may determine, for each supplier identifier (e.g., as received in first supplier item data 303 or second supplier item data 305), whether to update supplier identifier association data 392. For example, item computing grouping computing device 102 may determine that the supplier identifier is to be removed (e.g., split) from an association to a current retailer identifier and merged (e.g., assigned) to a another retailer identifier, whether a new retailer identifier is to be generated to be assigned to the supplier identifier, whether the supplier identifier is to be assigned to an existing retailer identifier, or whether no changes to supplier identifier association data 392 are needed.

For example, item computing grouping computing device 102 may determine whether first supplier identifier 354 is currently assigned to a retailer identifier by obtaining supplier identifier association data 392, and determining whether first supplier identifier 354 matches (e.g., is the same as) any supplier identifier 394. In some examples, supplier identification association data 392 indexes a plurality of supplier identification data (e.g., first supplier identification data 393) based on the value of the corresponding supplier identification (e.g., supplier identification 394). In these examples, item computing grouping computing device 102 may search supplier identification association data 392 based on the value of first supplier identifier 354. Other methods of (e.g., efficiently) indexing and looking up a matching supplier identifier 394 may also be employed.

If item computing grouping computing device 102 determines that first supplier identifier 354 does not match any supplier identifier 394, item computing grouping computing device 102 may generate new supplier identifier data, such as first supplier identifier data 393, where supplier identifier 394 is the first supplier identifier 354, and associated retailer identifier 398 is a value not currently used as an associated retailer identifier in supplier identifier association data 392 (e.g., the next available value in a list of available retailer identifier values). In some examples, an associated group identifier 396 is also generated (which may be a next available value in a list of available group identifier values). Item computing grouping computing device 102 may generate create new supplier identifier data 309 identifying these updates to supplier identifier association data 392.

In some examples, if item computing grouping computing device 102 determines that first supplier identifier 354 does not match any supplier identifier 394, item computing grouping computing device 102 may execute a machine learning model based on properties of the item corresponding to first supplier identifier 354 (e.g., item data 362 corresponding to first supplier identifier 354) to determine whether first supplier identifier 354 may assigned to an existing associated group identifier 396 and associated retailer identifier 398. For example, based on execution of the machine learning model, item computing grouping computing device 102 may determine a closest matching item with corresponding supplier identifier data within supplier identifier association data 392. Item computing grouping computing device 102 may assign first supplier identifier 354 by including first supplier identifier 354 within supplier identifiers 394 of the supplier identifier data corresponding to the closest matching item. Item computing grouping computing device 102 may generate assign to existing supplier identifier data 311 identifying these updates to supplier identifier association data 392.

If item computing grouping computing device 102 determines that first supplier identifier 354 matches any supplier identifier 394, item computing grouping computing device 102 further determines whether any corresponding associated group identifiers 396 match any group identifier 384 of group identification association data 382.

If there are no matching group identifiers, item grouping computing device 102 generates an indication that the associated group identifier 396 has no associated retailer identifier 386 in group identifier association data 382, and may display the indication, or transmit the indication, such as to an associate of a group of the retailer. In some examples, item grouping computing device 102 may generate first group data 383 for the associated group identifier 396 within group identifier association data 382, whereby the group identifier 384 is the associated group identifier 396, and the associated retailer identifier 386 is the associated retailer identifier 398. In addition, the supplier identifier 394 remains associated to associated retailer identifier 398.

If there is a matching group identifier, item computing grouping computing device 102 further determines whether associated retailer identifier 386 (corresponding to group identifier 384) matches the associated retailer identifier 398 (corresponding to associated group identifier 396).

If item computing grouping computing device 102 determines that associated retailer identifier 386 matches associated retailer identifier 398, item computing grouping computing device 102 does not update supplier identifier association data 392. As such, first supplier identifier 354, which matches supplier identifier 394, remains associated to associated group identifier 396 and associated retailer identifier 398.

If item computing grouping computing device 102 determines that associated retailer identifier 386 does not match associated retailer identifier 398, item computing grouping computing device 102 reassigns supplier identifier 394 (which matches first supplier identifier 354) to associated retailer identifier 386. For example, item computing grouping computing device 102 updates associated retailer identifier 398 with the value of associated retailer identifier 386. As a result, first supplier identifier 354, which matches supplier identifier 394, remains associated to associated group identifier 396, and is now associated to the retailer identifier provided by associated retailer identifier 386 and now stored in associated retailer identifier 398. Item computing grouping computing device 102 may generate merge to supplier identifier data 307 identifying these updates to supplier identifier association data 392.

Figure 4:
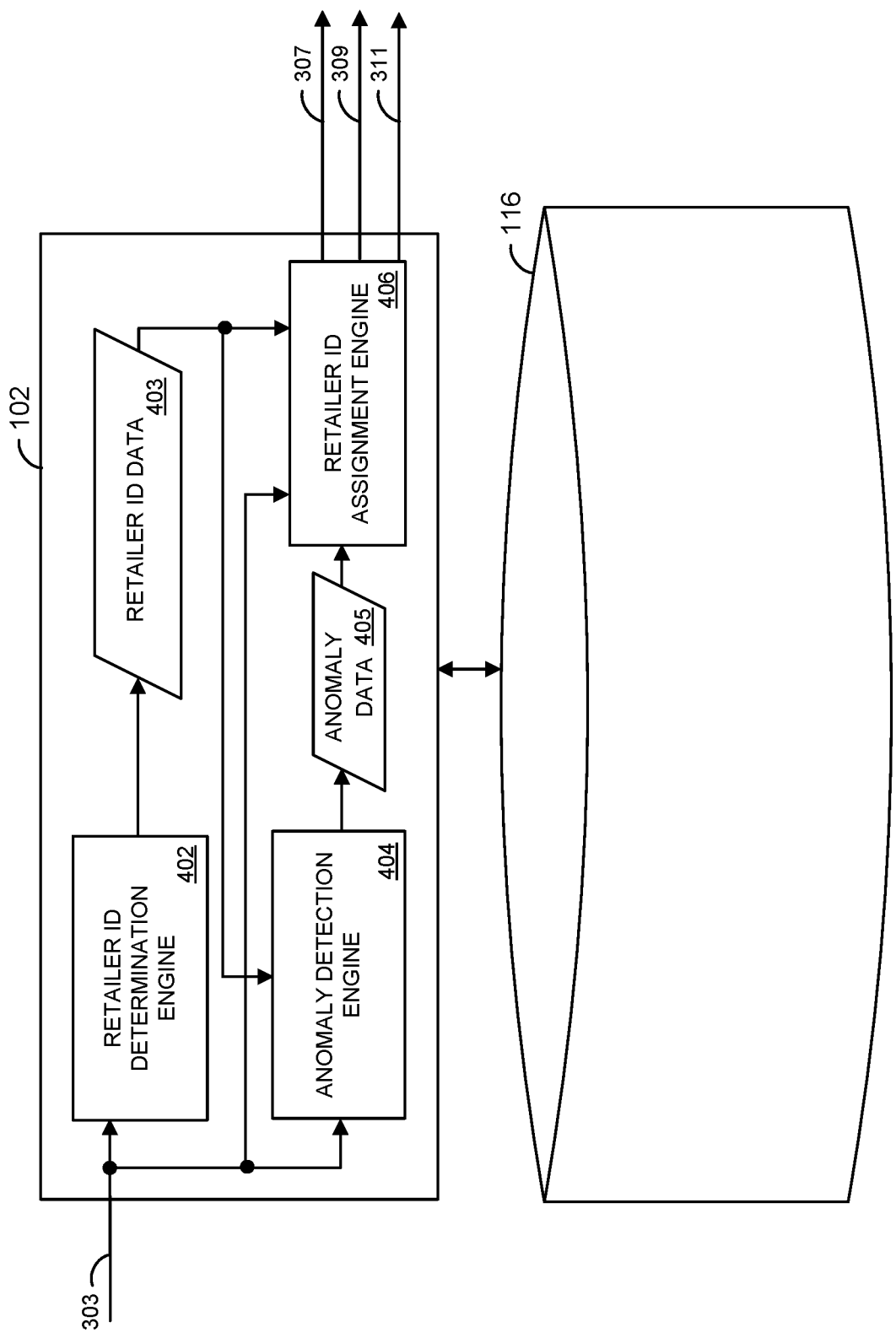
FIG. 4 is a block diagram illustrating exemplary portions of the item grouping computing device of FIG. 1 in accordance with some embodiments.

FIG. 4 illustrates exemplary portions of item computing grouping computing device 102. As indicated in the figure, item computing grouping computing device 102 includes retailer identifier determination engine 402, anomaly detection engine 404, and retailer identifier assignment engine 406. In some examples, one or more of retailer identifier determination engine 402, anomaly detection engine 404, and retailer identifier assignment engine may be implemented in hardware. In some examples, one or more of retailer identifier determination engine 402, anomaly detection engine 404, and retailer identifier assignment engine may be implemented as an executable program maintained in a tangible, non-transitory memory, such as instruction memory 207 of FIG. 2, that may be executed by one or processors, such as processor 201 of FIG. 2.

Retailer identifier determination engine 402 receives supplier item data, such as first supplier item data 303, identifying one or more supplier identifiers. Each supplier identifier identifies an item by a value, such as a GTIN or UPC. Retailer identifier determination engine 402 may determine a retailer identifier, such as first retailer identifier 714 or second retailer identifier 716, for each supplier identifier based on supplier identifier association data, such as supplier identifier association data 392 stored in database 116.

For example, and as described above with respect to FIG. 3, for each supplier identifier, retailer identifier determination engine 402 may remove (e.g., split) the supplier identifier from an association to a current retailer identifier and merge (e.g., assign) the supplier identifier to another retailer identifier. As another example, retailer identifier determination engine 402 may determine that a new retailer identifier is to be generated and be assigned to the supplier identifier. In some examples, retailer identifier determination engine 402 determines that the supplier identifier is not currently assigned to a retailer identifier, and is to be assigned to an existing retailer identifier. In some examples, retailer identifier determination engine 402 determines that no changes to the supplier identifier association data is needed.

Based on the above determinations, retailer identifier determination engine 402 generates retailer identifier data 403 identifying, for each supplier identifier, a retailer identifier. For example, retailer identifier data 403 may identify a retailer identifier for the supplier identifier different from a retailer identifier currently assigned to the supplier identifier (e.g., as in the case of split and assign). As another example, retailer identifier data 403 may generate a new retailer identifier, and identify the new retailer identifier for the supplier identifier (e.g., as in the case of generating a new retailer identifier within supplier identifier association data). As yet another example, retailer identifier data 403 may identify an already assigned (e.g., currently assigned) retailer identifier for the supplier identifier (e.g., as in the case of no changes).

Anomaly detection engine 404 also receives first supplier item data 303 as well as retailer identifier data 403. Anomaly detection engine 404 may detect one or more anomalies associated with any retailer identifier identified in retailer identifier data 403. An anomaly may indicate an improper association of a retailer identifier to the supplier identifier. In some examples, anomaly detection engine 404 implements (e.g., execute) a machine learning model to detect anomalies with a retailer identifier received in retailer identifier data 403 being associated with the corresponding supplier identifier received in first supplier item data 303.

For example, anomaly detection engine 404 may determine items associated with the retailer identifier (e.g., based on supplier identifier association data 392 stored in database 116), as well as properties of the item corresponding to first supplier item data 303. Anomaly detection engine 404 may then execute the machine learning model based on the obtained properties (e.g., the properties of the item as well as the properties of the items associated with the retailer identifier) to detect the anomalies. Anomaly detection engine 404 generates anomaly data 405 identifying any anomalies.

Retailer identifier assignment engine 406 receives retailer identifier data 403 and anomaly data 405, and may adjust supplier identifier association data 392 in database 116 based on retailer identifier data 403 and anomaly data 405. For example, if anomaly data 405 indicates no anomaly, retailer identifier assignment engine 406 may generate one or more of merge to supplier identifier data 307, create new identifier data 309, assign to existing identifier data 311 (e.g., as discussed with respect to FIG. 3) to update supplier identifier association data 392. If, however, anomaly data 405 indicates an anomaly with respect to a retailer identifier identified by retailer identifier data 403 (being associated to a supplier identifier identified by first supplier item data 303), retailer identifier assignment engine 406 may determine whether to permit the changes.

For example, anomaly data 405 may identify a score associated with each anomaly. In some examples, if the score is beyond (e.g., at or above) a threshold, retailer identifier assignment engine 406 may not allow the changes. Retailer identifier assignment engine 406 may log indications of the anomaly, the supplier identifier, and the retailer identifier in, for example, database 116. In some examples, retailer identifier assignment engine 406 provides an indication of the anomaly, for example, on a display (e.g., display 206), or generates and transmits a communication (e.g., via transceiver 204). In some examples, if the score is not beyond the threshold (e.g., below the threshold), retailer identifier assignment engine 406 may allow the changes. Retailer identifier assignment engine 406 may generate one or more of merge to supplier identifier data 307, create new identifier data 309, assign to existing identifier data 311 to update supplier identifier association data 392.

Figure 5:
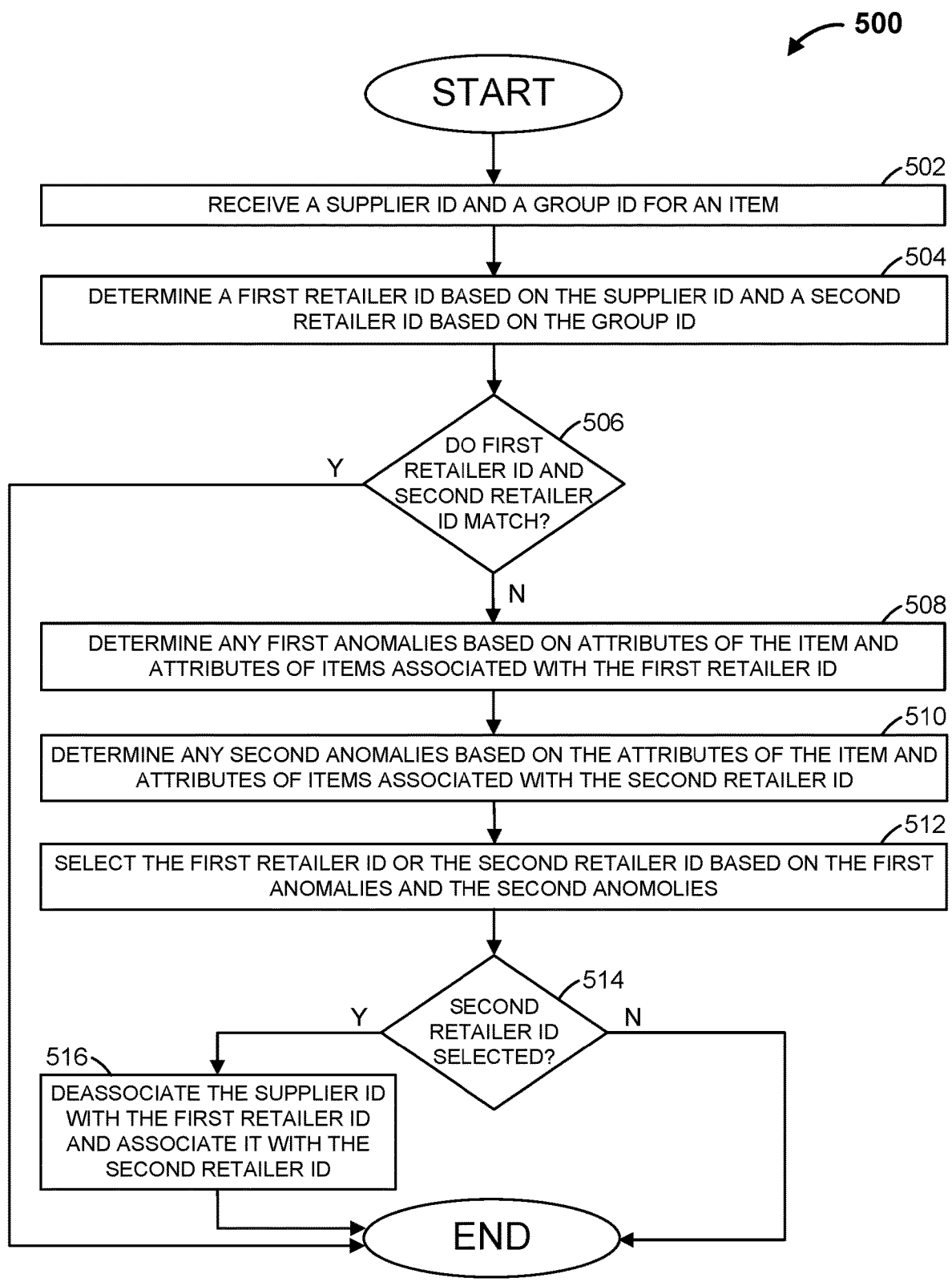
FIG. 5 is a flowchart of an example method that can be carried out by the item grouping computing device of FIG. 1 in accordance with some embodiments.

FIG. 5 is a flowchart of an example method 500 that can be carried out by a computing device, such as the item grouping computing device 102 of FIG. 1. Beginning at step 502, the computing device receives a supplier identifier and a group identifier for an item. For example, item grouping computing device 102 may obtain a first supplier identifier 702 and a first group identifier 710 from supplier identifier association data 392 stored in database 116. At step 504, the computing device determines a first retailer identifier based on the supplier identifier. For example, item grouping computing device 102 may determine first retailer identifier 714 based on an association to first supplier identifier 702. The computing device also determines a second retailer identifier based on the group identifier. For example, item grouping computing device 102 may determine first retailer identifier 715 based on an association to first group identifier 710.

Proceeding to step 506, the computing device determines whether the first retailer identifier matches (e.g., is the same as) the second retailer identifier. If the first retailer identifier matches the second retailer identifier, the method ends. Otherwise, if the computing device determines that first retailer identifier does not match the second retailer identifier, the method proceeds to step 508.

At step 508, the computing device determines any first anomalies based on attributes of the item and attributes of items associated with the first retailer identifier. For example, item grouping computing device 102 may obtain attributes of the item from catalog data 360 stored in database 116. In addition, item grouping computing device 102 may also determine items corresponding to the first retailer identifier (e.g., items with supplier identifiers associated to the first retailer identifier), and may obtain attributes of those items from catalog data 360 stored in database 116. Item grouping computing device 102 may then execute a machine learning model based on the obtained attributes of all items to detect any anomalies. Similarly, at step 510, the computing device determines any second anomalies based on the attributes of the item and attributes of items associated with the second retailer identifier.

Proceeding to step 512, the computing device selects between the first retailer identifier and the second retailer identifier based on the first anomalies and the second anomalies. For example, if there are no first anomalies but there are second anomalies, the computing device selects the first retailer identifier. Otherwise, if there are first anomalies but no second anomalies, the computing device selects the second retailer identifier. In some examples, execution of the machine learning model at steps 508 and 510 generates a first score, and a second score, respectively. The computing device may compare the first score to the second score to determine whether to select the first retailer identifier or the second retailer identifier. For example, the computing device selects the retail identifier associated with the score indicating lesser anomalies (e.g., lower of the first score and the second score).

Proceeding to step 514, if the second retailer identifier is selected, the method proceeds to step 516, where the supplier identifier is disassociated with the first retailer identifier and associated with the second retailer identifier. For example, item grouping computing device 102 may "split" the association of the supplier identifier to the first retailer identifier, and assign the supplier identifier to the second retailer identifier. The method then ends. If at step 514 the second retailer is not selected (i.e., the first retailer is selected), the method then ends. As such, the supplier identifier remains associated to the first retailer identifier.

Figure 6:
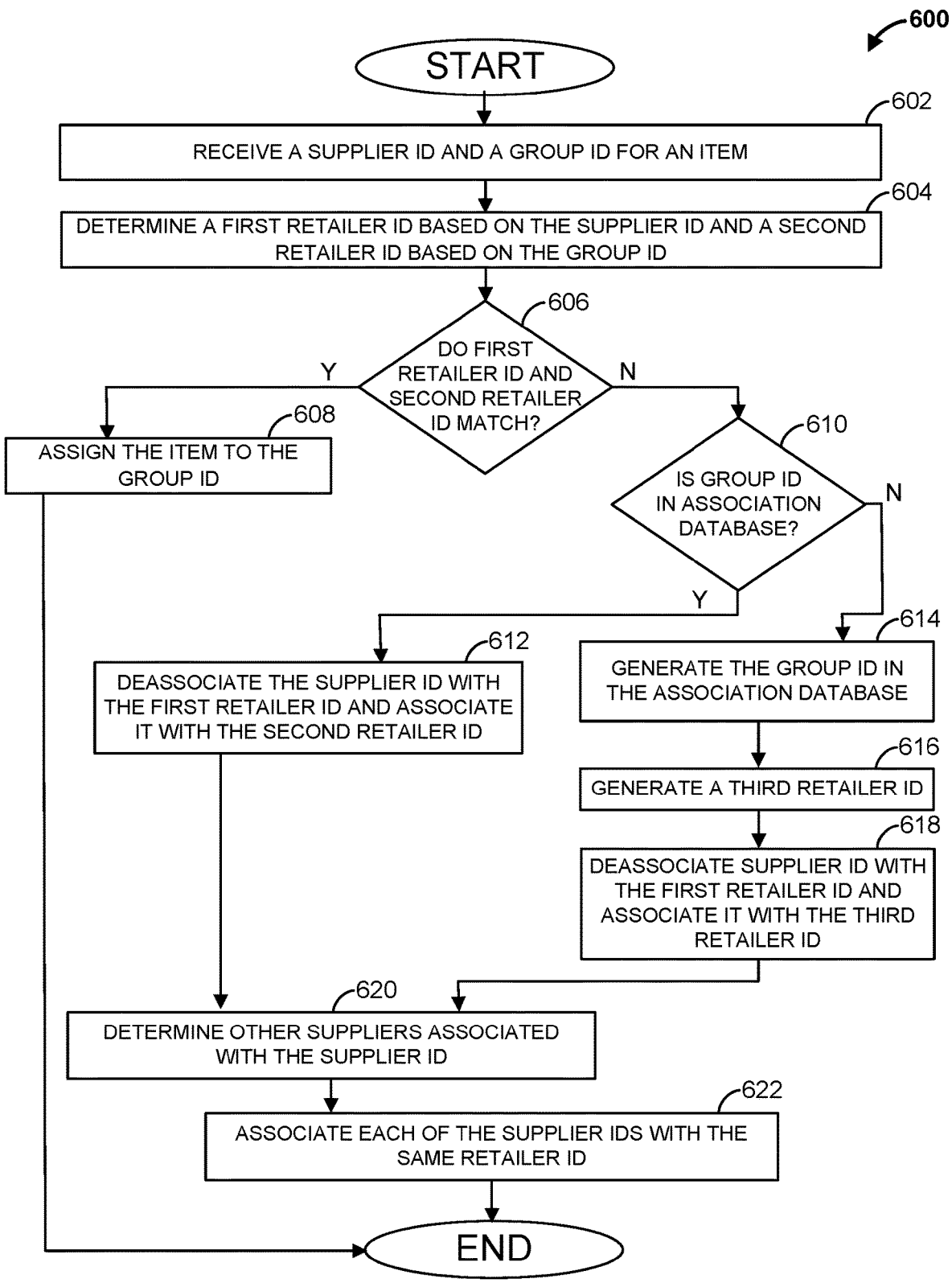
FIG. 6 is a flowchart of another example method that can be carried out by the item grouping computing device of FIG. 1 in accordance with some embodiments.

FIG. 6 is a flowchart of an example method 600 that can be carried out by a computing device, such as the item grouping computing device 102 of FIG. 1. Beginning at step 602, the computing device receives a supplier identifier and a group identifier. The group identifier may be one that is included in group identifier association data 382, but not in in supplier identifier association data 392. At step 604, the computing device determines a first retailer identifier based on the supplier identifier. The computing device further determines a second retailer identifier based on the group identifier. For example, the second retailer identifier may be an associated retailer identifier 386 that corresponds to the group identifier, as identified in group identifier association data 382.

Proceeding to step 606, the computing device determines whether the first retailer identifier and the second retailer identifier match. If the first retailer identifier and the second retailer identifier match, the method proceeds to step 608, where the item is assigned to the group identifier. For example, item grouping computing device 102 may update supplier identifier association data 392 to associate the supplier identifier to the grouping identifier. The method then ends.

If, however, the first retailer identifier and the second retailer identifier do not match, the method proceeds to step 610, where the computing device determines whether the group identifier already exist in an association database (e.g., within supplier identifier association data 392). For example, item grouping computing device 102 may determine whether the group identifier matches a group identifier in supplier identifier association data 392. If the group identifier exists in the association database, the method proceeds to step 612. At step 612, the supplier identifier is disassociated with the first retailer identifier and is associated with the second retailer identifier. The method then proceeds to step 620.

If at step 610, however, the group identifier does not already exist in the association database, the method proceeds to step 614, where the group identifier is generated in the association database. The method then proceeds to step 616, where a third retailer identifier is generated. The third retailer identifier may be the next retailer identifier in a list of unused identifiers. Proceeding to step 618, the supplier identifier is disassociated with the first retail identifier, and is associated with the third retailer identifier. The method then proceeds to step 620.

At step 620, other suppliers associated with the supplier identifier are determined. For example, item grouping computing device 102 may determine any other supplier that uses the same supplier identifier (e.g., by searching a list of supplier identifiers for each supplier stored in database 116). Proceeding to step 622, each of the supplier identifiers are associated with the same retailer identifier. For example, if proceeding from step 612, each of the supplier identifiers are associated with the second retailer identifier. If proceeding from step 618, each of the supplier identifiers are associated with the third retailer identifier. The method then ends.

Figure 8:
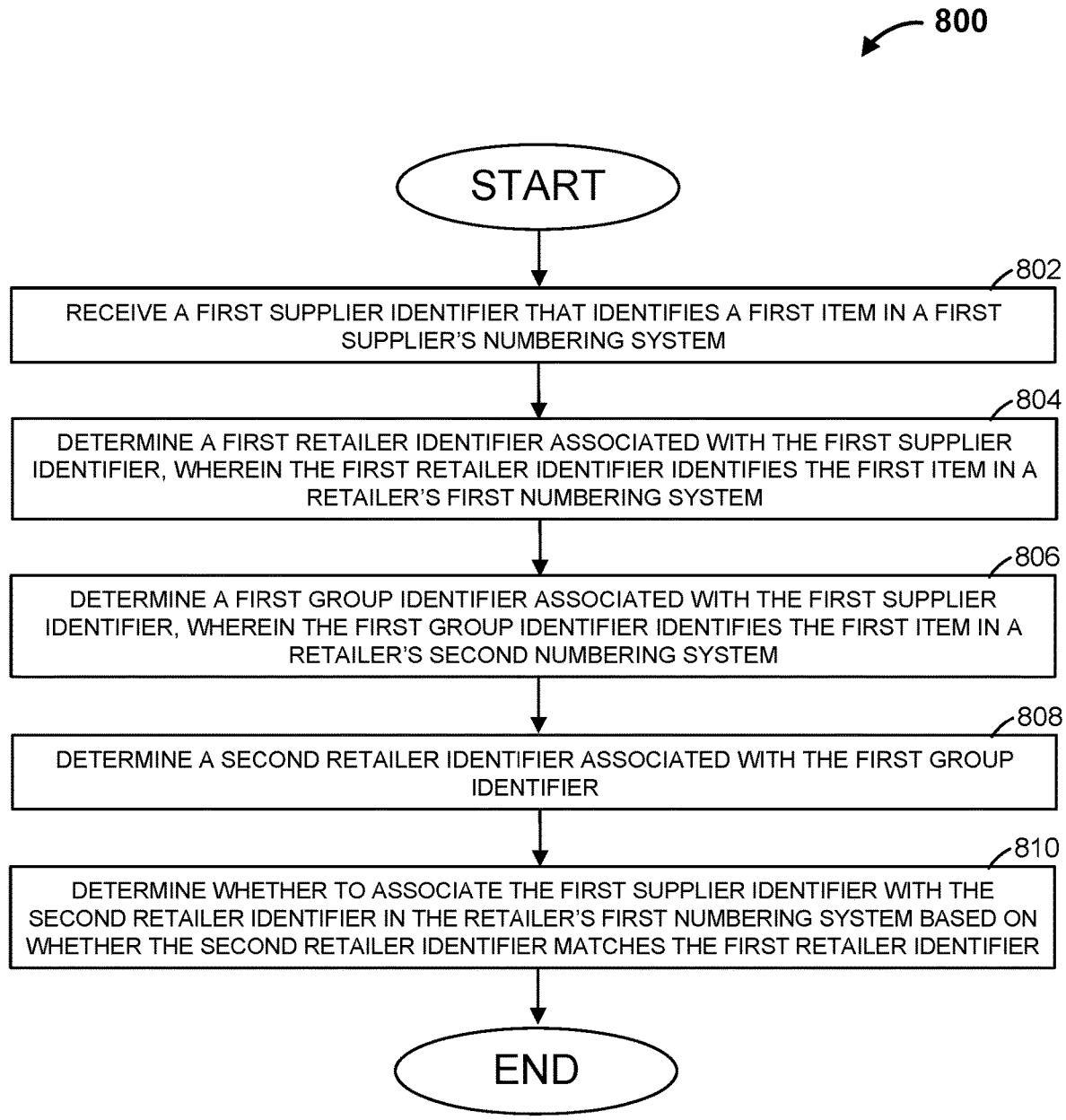
FIG. 8 is a flowchart of yet another example method that can be carried out by the item grouping computing device of FIG. 1 in accordance with some embodiments.

FIG. 8 is a flowchart of an example method 800 that can be carried out by a computing device, such as the item grouping computing device 102 of FIG. 1. Beginning at step 802, the computing device receives a first supplier identifier that identifies a first item in a first supplier's numbering system. At step 804, the computing device determines a first retailer identifier associated with the first supplier identifier, wherein the first retailer identifier identifies the first item in a retailer's first numbering system.

Proceeding to step 806, the computing device determines a first group identifier associated with the first supplier identifier, wherein the first group identifier identifies the first item in a retailer's second numbering system. At step 808, the computing device determines a second retailer identifier associated with the first group identifier. At step 810, the computing device determines whether to associate the first supplier identifier with the second retailer identifier in the retailer's first numbering system based on whether the second retailer identifier matches the first retailer identifier. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
 a database having a hierarchical structure defined by a plurality of supplier-group associations, a plurality of supplier-item associations, and a plurality of group-item associations;
 a memory having instructions stored thereon; and
 a processor configured to read the memory and coupled to the database, wherein the processor configured to read the instructions to:
  receive first supplier data including a first supplier identifier that identifies a first item in a first supplier's numbering system;
  store the first supplier data in the database;
  determine a first retailer identifier associated with the first supplier identifier, wherein the first retailer identifier identifies the first item in a first retail numbering system, and wherein the first retail identifier corresponds to first item data stored within the database;
  generate a first supplier-item association defining a hierarchical relationship between the first supplier data and the first item data in the database;
  determine a first group identifier associated with the first supplier identifier, wherein the first group identifier identifies a plurality of items in a second retail numbering system, wherein the first group identifier corresponds to first group data stored within the database, wherein each item of the plurality of items are assigned to the first group identifier, and wherein the plurality of items includes the first item;
  generate a first supplier-group association defining a hierarchical relationship between the first supplier data and first group data in the database;
  determine a second retailer identifier associated with the first group identifier based on one or more group-item associations defining a hierarchical relationship between at least the first group identifier and an associated set of retailer identifiers, wherein the second retailer identifier corresponds to second item data within the database;
  train a machine learning model to detect anomalies in the hierarchical structure of the database, wherein the machine learning model is trained by a supervised training dataset based on attributes of items in the plurality of items, wherein the machine learning model is configured to generate an anomaly score between the first item data and the second item data, and wherein the machine learning model is configured to generate the anomaly score by:
generating a first word embedding representative of at least one attribute of the first item data;
generating a second word embedding representative of the at least one attribute of the second item data; and
comparing the first word embedding and the second word embedding to generate the anomaly score;
generate a second supplier-item association defining a hierarchical relationship between first supplier data and the second item data in the database when the second retailer identifier matches the first retailer identifier, and when the second retailer identifier does not match the first retailer identifier and the anomaly score is below a predetermined threshold;
in response to determining the anomaly score is equal to or above the predetermined threshold, transmit an electronic communication identifying the first item data and the second item data; and
train an additional machine learning model to detect anomalies in the hierarchical structure of the database, wherein the additional machine learning model is trained by a supervised training dataset based on attributes of items in the plurality of items and at least the second supplier-item association.

2. The system of claim 1, wherein the processor is configured to read the instructions to:
determine that the plurality of group-item associations does not include a group-item association between the first group data and item data; and
generate the group-item association between the first supplier identifier and the first group data.

3. The system of claim 1, wherein the trained machine learning model is configured to:
determine a score associated with each of a plurality of anomalies; and
compare the score associated with each of the plurality of anomalies to the predetermined threshold, wherein the second supplier-item association is generated when the score associated with each of the plurality of anomalies is below the predetermined threshold.

4. The system of claim 1, wherein:
the retailer's first numbering system associates a plurality of supplier identifiers to a first plurality of group identifiers and a plurality of retailer identifiers; and
the retailer's second numbering system associates a second plurality of group identifiers and at least a portion of the plurality of supplier identifiers.

5. The system of claim 1, wherein the processor is further configured to read the instructions to:
determine at least a first attribute for the first item;
determine at least a second attribute of a second item corresponding to a second supplier identifier and a third attribute of a third item corresponding to a third supplier identifier; and
generate the second supplier-item association when a first number of anomalies based on the at least first attribute and the at least second attribute and a second number of anomalies based on the at least first attribute and the at least third attribute are each below the predetermined threshold.

6. The system of claim 1, wherein each of the at least one-attribute of the first item data and the at least one attribute of the second item data comprise item descriptions.

7. A computer-implemented method comprising:
receiving, by a processor, first supplier data including a first supplier identifier that identifies a first item in a first supplier's numbering system;
storing, by the processor, the first supplier data in a database, wherein the database includes a hierarchical structure defined by a plurality of supplier-group associations, a plurality of supplier-item associations, and a plurality of group-item associations;
determining, by the processor, a first retailer identifier associated with the first supplier identifier, wherein the first retailer identifier identifies the first item in a first retail numbering system, and wherein the first retail identifier corresponds to first item data stored within the database;
generating, by the processor, a first supplier-item association defining a hierarchical relationship between the first supplier data and the first item data in the database;
determining, by the processor, a first group identifier associated with the first supplier identifier, wherein the first group identifier identifies a plurality of items in a second retail numbering system, wherein the first group identifier corresponds to first group data stored within the database, wherein each item of the plurality of items are assigned to the first group identifier, and wherein the plurality of items includes the first item;
generating, by the processor, a first supplier-group association defining a hierarchical relationship between the first supplier data and first group data in the database;
determining, by the processor, a second retailer identifier associated with the first group identifier based on one or more group-item associations defining a hierarchical relationship between at least the first group identifier and an associated set of retailer identifiers, wherein the second retailer identifier corresponds to second item data within the database;
training, by the processor, a machine learning model to detect anomalies in the hierarchical structure of the database, wherein the machine learning model is trained by a supervised training dataset based on attributes of items in the plurality of items, wherein the machine learning model is configured to generating an anomaly score between the first item data and the second item data, and wherein the machine learning model is configured to generate the anomaly score by:
generating a first word embedding representative of at least one attribute of the first item data;
generating a second word embedding representative of the at least one attribute of the second item data; and
comparing the first word embedding and the second word embedding to generate the anomaly score;
generate, by the processor, a second supplier-item association defining a hierarchical relationship between first supplier data and the second item data when the second retailer identifier matches the first retailer identifier, and when the second retailer identifier does not match the first retailer identifier and the anomaly score is below a predetermined threshold;
in response to determining the anomaly score is equal to or above the predetermined threshold, transmitting, by the processor, an electronic communication identifying the first item data and the second item data; and training, by the processor, an additional machine learning model to detect anomalies in the hierarchical structure of the database, wherein the additional machine learning model is trained by a supervised training dataset based on attributes of items in the plurality of items and at least the second supplier-item association.

8. The method of claim 7, further comprising:
determining, by the processor, that the plurality of group-item associations does not include a group-item association between the first group data and the first item data; and
generating, by the processor, the group-item association between the first supplier identifier-and the first group data.

9. The method of claim 7, wherein the trained machine learning model is configured to:
determine a score associated with each of a plurality of anomalies; and
compare the score associated with each of the plurality of anomalies to the predetermined threshold wherein the second supplier-item association is generated when the score associated with each of the plurality of anomalies is below the predetermined threshold.

10. The method of claim 7 wherein:
the first retail numbering system associates a plurality of supplier identifiers to a first plurality of group identifiers and a plurality of retailer identifiers; and
the second retail numbering system associates a second plurality of group identifiers and at least a portion of the plurality of supplier identifiers.

11. The method of claim 7, comprising
determining, by the processor, at least a first attribute for the first item;
determining, by the processor, at least a second attribute of a second item corresponding to a second supplier identifier and a third attribute of a third item corresponding to a third supplier identifier; and
generating, by the processor, the second supplier-item association when a first number of anomalies based on the at least first attribute and the at least second attribute and a second number of anomalies based on the at least first attribute and the at least third attribute are each below the predetermined threshold.

12. The method of claim 7, wherein each of the at least one-attribute of the first item data and the at least one attribute of the second item data comprise item descriptions.

* * * * *